US009608310B2

(12) United States Patent
Huang

(10) Patent No.: US 9,608,310 B2
(45) Date of Patent: Mar. 28, 2017

(54) APPARATUS HAVING A CONDUCTIVE HOUSING AND AN ANTENNA WITH TUNABLE RESONANCE

(71) Applicant: Nokia Technologies Oy, Espoo (FI)

(72) Inventor: Wei Huang, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/286,365

(22) Filed: May 23, 2014

(65) Prior Publication Data

US 2015/0340756 A1 Nov. 26, 2015

(51) Int. Cl.
*H04M 1/00* (2006.01)
*H01Q 1/24* (2006.01)
*H01Q 13/10* (2006.01)

(52) U.S. Cl.
CPC ............. *H01Q 1/243* (2013.01); *H01Q 13/10* (2013.01)

(58) Field of Classification Search
None
See application file for complete search history.

(56) References Cited

U.S. PATENT DOCUMENTS 6,424,300 B1 7/2002 Sanford et al.
7,551,142 B1 6/2009 Zhang et al.
7,724,532 B2 5/2010 Zadesky et al.
2010/0123632 A1* 5/2010 Hill ........................ H01Q 1/243 343/702
2010/0123635 A1 5/2010 Lopez et al.
2011/0085316 A1* 4/2011 Myers .................... H05K 3/284 361/818
2011/0255252 A1* 10/2011 Sloey .................. H04B 1/3816 361/752
2012/0009884 A1 1/2012 Rao et al.
2013/0023816 A1* 1/2013 Bachinski .......... A61N 1/36014 604/20

(Continued)

FOREIGN PATENT DOCUMENTS

EP 1 858 112 A1 11/2007
EP 2405534 A1 1/2012

(Continued)

OTHER PUBLICATIONS

International Search Report and Written Opinion for International Application No. PCT/FI2015/050296, dated Jun. 25, 2015.

*Primary Examiner* — Adolf Dsouza
(74) *Attorney, Agent, or Firm* — Alston & Bird LLP

(57) ABSTRACT

An apparatus and a portable electronic device are provided to facilitate tuning of the resonance of an antenna at least partially disposed within a conductive housing. As such, an apparatus is provided that includes a conductive housing having a first conductive portion. The first conductive portion defines a non-conductive aperture. The apparatus also includes a second conductive portion disposed at least partially within the conductive housing. The second conductive portion defines an open-ended non-conductive slot. The slot is configured to couple to radio frequency circuitry. The apparatus further includes a conductive element extending between and conductively coupling the first and second conductive portions. A personal electronic device that embodiments the apparatus is also provided.

20 Claims, 4 Drawing Sheets

(56) References Cited

U.S. PATENT DOCUMENTS

| | | | | |
|---|---|---|---|---|
| 2013/0027254 | A1* | 1/2013 | Korva | H01Q 7/00 343/702 |
| 2013/0176178 | A1 | 7/2013 | Chen et al. | |
| 2014/0125528 | A1 | 5/2014 | Tsai et al. | |
| 2014/0126172 | A1 | 5/2014 | Fahlgren et al. | |
| 2014/0361936 | A1* | 12/2014 | Hallivuori | H01Q 1/243 343/702 |

FOREIGN PATENT DOCUMENTS

| | | | |
|---|---|---|---|
| EP | 2 518 823 | A1 | 10/2012 |
| EP | 2618423 | A2 | 7/2013 |
| EP | 2677600 | A1 | 12/2013 |
| WO | WO 2010122220 | A1 | 10/2010 |
| WO | WO 2013/107921 | A1 | 7/2013 |

* cited by examiner

APPARATUS HAVING A CONDUCTIVE HOUSING AND AN ANTENNA WITH TUNABLE RESONANCE

TECHNOLOGICAL FIELD

An example embodiment of the present invention relates generally to an antenna having tunable resonance and, more particularly, to an antenna having a tunable resonance that is disposed at least partially within a conductive housing, such as a conductive housing of a portable electronic device.

BACKGROUND

A wide variety of portable electronic devices, such as mobile telephones, smartphones, personal digital assistants (PDAs), tablet computers, laptop computers and the like, include one or more antennas. A metallic or other conductive housing is considered by some to enhance the aesthetic quality of a portable electronic device. As such, an increasing number of these portable electronic devices are constructed so as to have a metallic or other conductive housing, such as a cover or a portion of a cover, formed of metallic or other conductive materials.

Some portable electronic devices are being designed to include an increased number of antennas with the number of antennas per device anticipated to continue to increase over time as a result of the requirements or other preferences of network operators. For a portable electronic device having a conductive housing, the antennas may be generally disposed within the conductive housing, thereby reducing the radiation efficiency of the antennas. Further, antenna resonance is generally dependent upon the mechanical structure. As such, antenna resonance is vulnerable to changes in the mechanical structure and, as such, may be difficult to control from the antenna perspective which may, in turn, limit the performance of the antenna.

BRIEF SUMMARY

An apparatus and a portable electronic device are provided according to example embodiments of the present invention so as to facilitate tuning of the resonance of an antenna at least partially disposed within a conductive housing. As such, the apparatus and the associated portable electronic device may enjoy the aesthetic qualities attributable to a conductive housing. However, the performance of the one or more antennas of the apparatus or associated portable electronic device may be facilitated even though the antenna is at least partially disposed within the conductive housing by permitting the resonance of the antenna to be tuned.

In an example embodiment, an apparatus is provided that includes a conductive housing having a first conductive portion. The first conductive portion defines a non-conductive aperture. The apparatus of this example embodiment also includes a second conductive portion disposed at least partially within the conductive housing. The second conductive portion defines an open-ended non-conductive slot. The slot is configured to couple to radio frequency circuitry. The apparatus of this example embodiment also includes a conductive element extending between and conductively coupling the first and second conductive portions.

The apparatus of an example embodiment may also include a further conductive element positioned within and extending across a non-conductive aperture. In an example embodiment, the apparatus may also include a printed wiring board that includes the second conductive portion. The resonance may be configured to be tuned by one or more of the length of the slot, the location at which the slot is fed with signals from the radio frequency circuitry or the location of the conductive element relative to the slot. The conductive element may be configured to form an exterior portion of a device that incorporates the apparatus or to include a coating of a non-conductive material. In an example embodiment, the conductive housing includes a first pair of opposed side surfaces and a second pair of opposed side surfaces. The first pair of opposed side surfaces is wider than the second pair of opposed side surfaces. The conductive element of this example embodiment is conductively coupled to a side surface of the first pair. In an example embodiment, the first pair of opposed side surfaces includes first and second side surfaces. The first side surface is configured to carry a display such that the first side surface includes a bar positioned between the display and the non-conductive aperture. The conductive element of this example embodiment is conductively coupled to the bar of the first side surface.

In another example embodiment, an apparatus is provided that includes a conductive housing including a first conductive portion. The first conductive portion defines a non-conductive aperture. The apparatus of this example embodiment also includes a printed wiring board including a second conductive portion disposed at least partially within the conductive housing. The second conductive portion defines an open-ended non-conductive slot. The slot is configured to couple to radio frequency circuitry. The apparatus of this example embodiment also includes a conductive element extending between and conductively coupling the first and second conductive portions. The resonance is configured to be turned in accordance with this example embodiment by one or more of the length of the slot, the location at which the slot is fed with signals from the radio frequency circuitry or the location of the conductive element relative to the slot.

The apparatus of an example embodiment may also include a further conductive element positioned within and extending across the non-conductive aperture. The conductive housing of an example embodiment includes a first pair of opposed side surfaces and a second pair of opposed side surfaces. The first pair of opposed side surfaces is wider than the second pair of opposed side surfaces. The conductive element of this example embodiment is conductively coupled to a side surface of the first pair. The first pair of opposed side surfaces of an example embodiment includes first and second side surfaces. The first side surface is configured to carry a display such that the first side surface includes a bar positioned between the display and the non-conductive aperture. A conductive element of this example embodiment is conductively coupled to the bar of the first side surface.

In a further example embodiment, a portable electronic device is provided that includes a display and a conductive housing configured to carry the display. The conductive housing includes a first conductive portion that defines a non-conductive aperture. The portable electronic device of this example embodiment also includes radio frequency circuitry disposed at least partially within the conductive housing. The radio frequency circuitry is configured to transmit and/or receive radio frequency signals. The portable electronic device of this example embodiment also includes a second conductive portion disposed at least partially within a conductive housing. The second conductive portion defines an open-ended non-conductive slot. The slot is configured to couple to the radio frequency circuitry.

The portable electronic device of this example embodiment also includes a conductive element extending between and conductively coupling the first and second conductive portions.

A portable electronic device in accordance with an example embodiment also includes a further conductive element positioned within and extending across the non-conductive aperture. A portable electronic device in accordance with an example embodiment also includes a printed wiring board that includes the second conductive portion. The resonance is configured to be tuned in accordance with an example embodiment by one or more of the length of the slot, the location at which the slot is fed with radio frequency signals from the radio frequency circuitry or the location of the conductive element relative to the slot. The conductive element may be configured to form an exterior portion of the portable electronic device or to include a coating of a non-conductive material. The conductive housing of an example embodiment includes a first pair of opposed side surfaces and a second pair of opposed side surfaces. The first pair of opposed side surfaces is wider than the second pair of opposed side surfaces. The conductive element of this example embodiment is conductively coupled to a side surface of the first pair. In an example embodiment, the first pair of opposed side surfaces includes first and second side surfaces. The first side surface is configured to carry the display such that the first side surface includes a bar positioned between the display and the non-conductive aperture. In this example embodiment, the conductive element is conductively coupled to the bar of the first side surface.

BRIEF DESCRIPTION OF THE DRAWINGS

Figure 1:
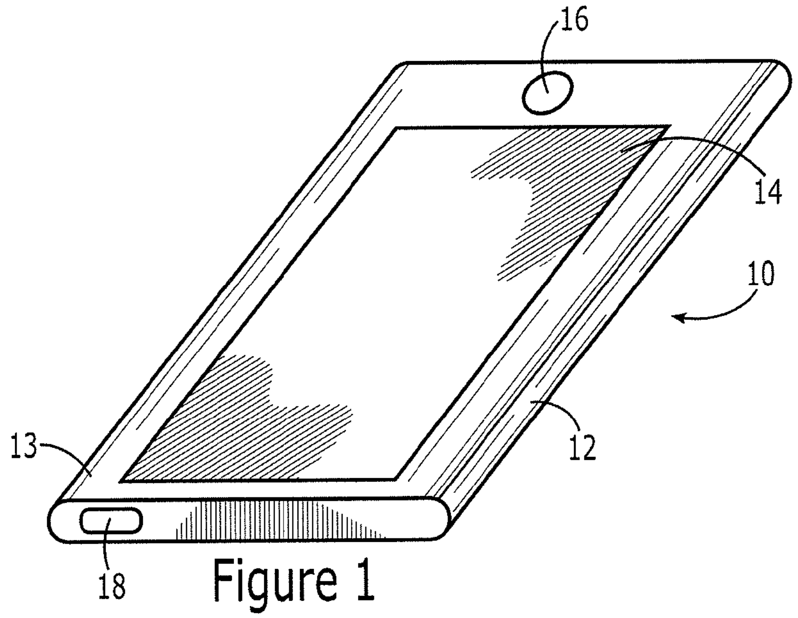
Figure 2:
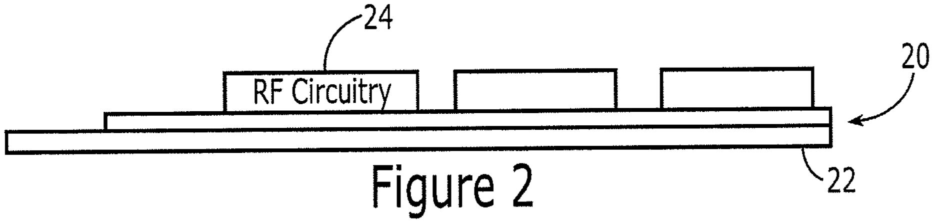
Figure 3:
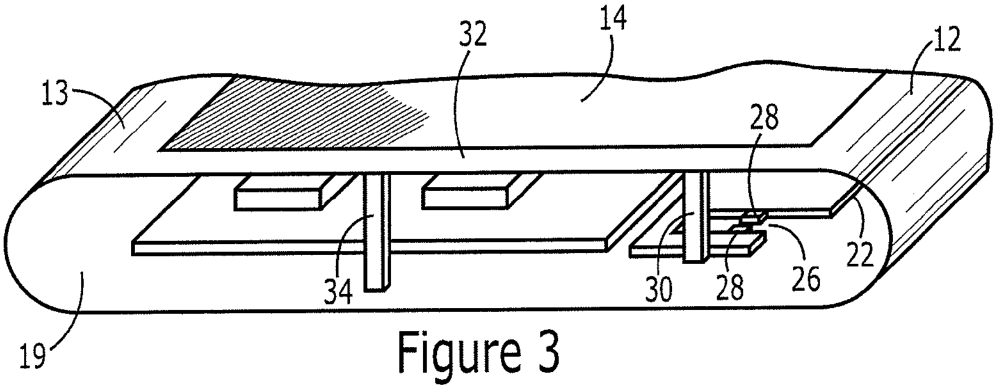
Figure 4:
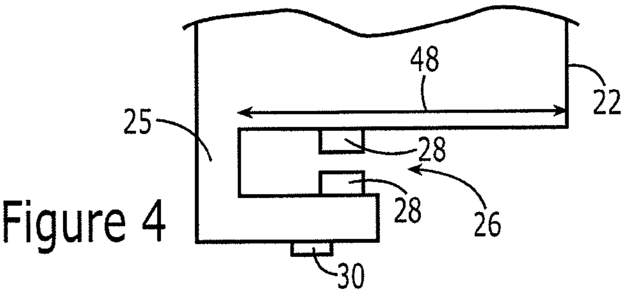
Figure 5:
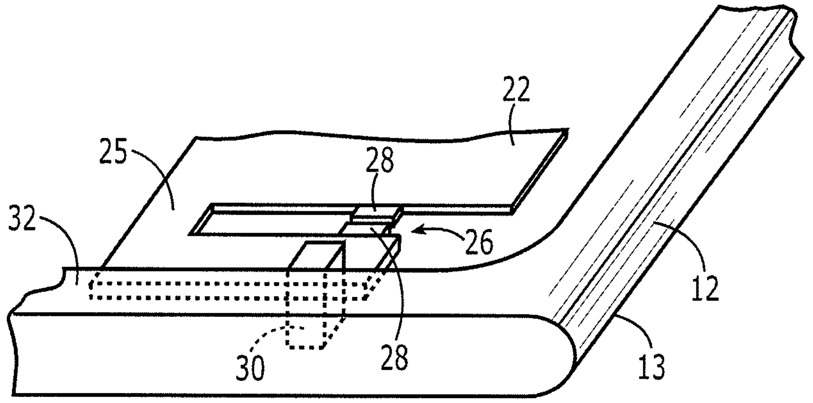
Figure 6:
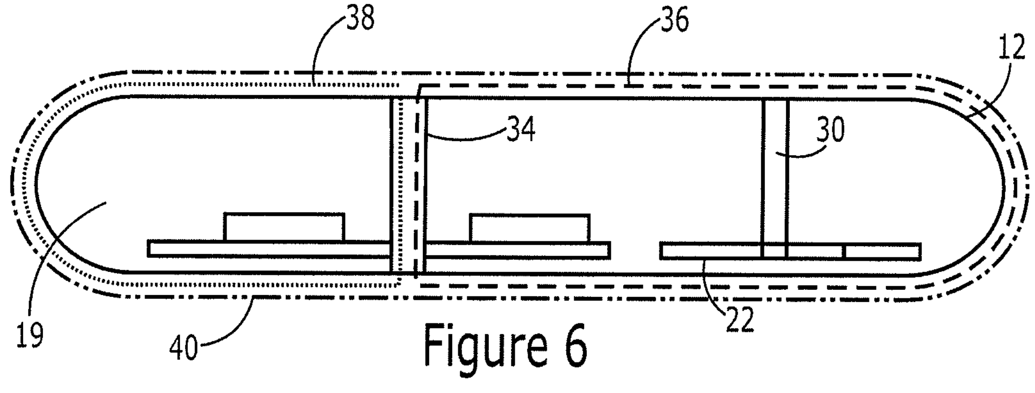
Figure 7:
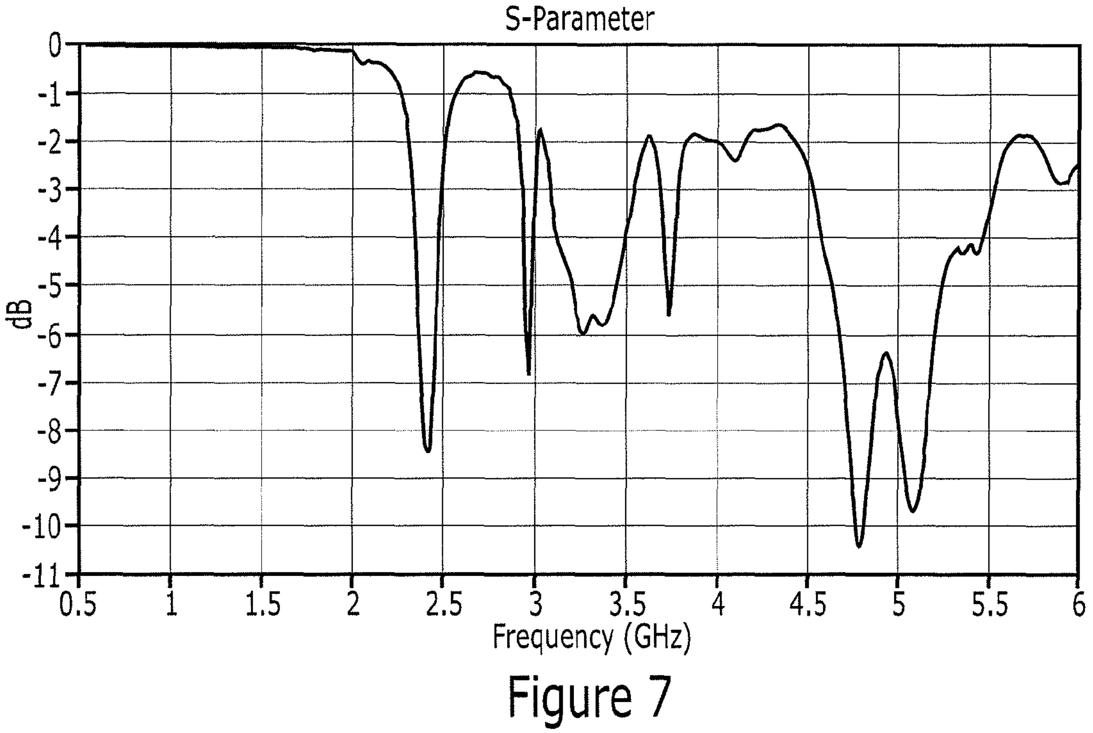
Figure 8:
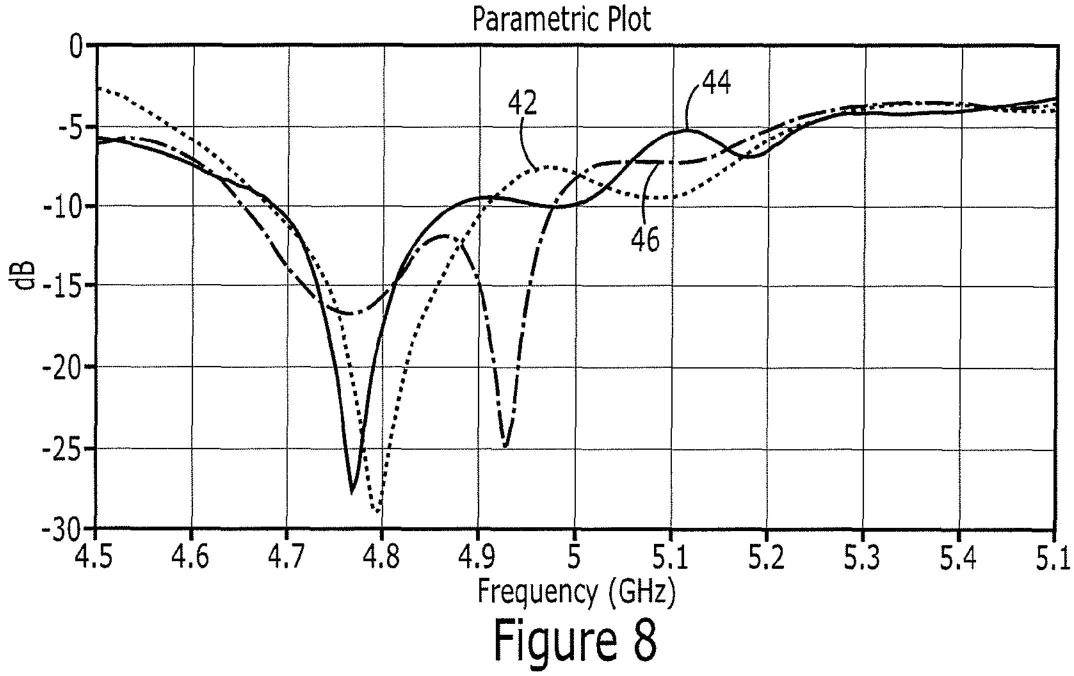
Figure 9:
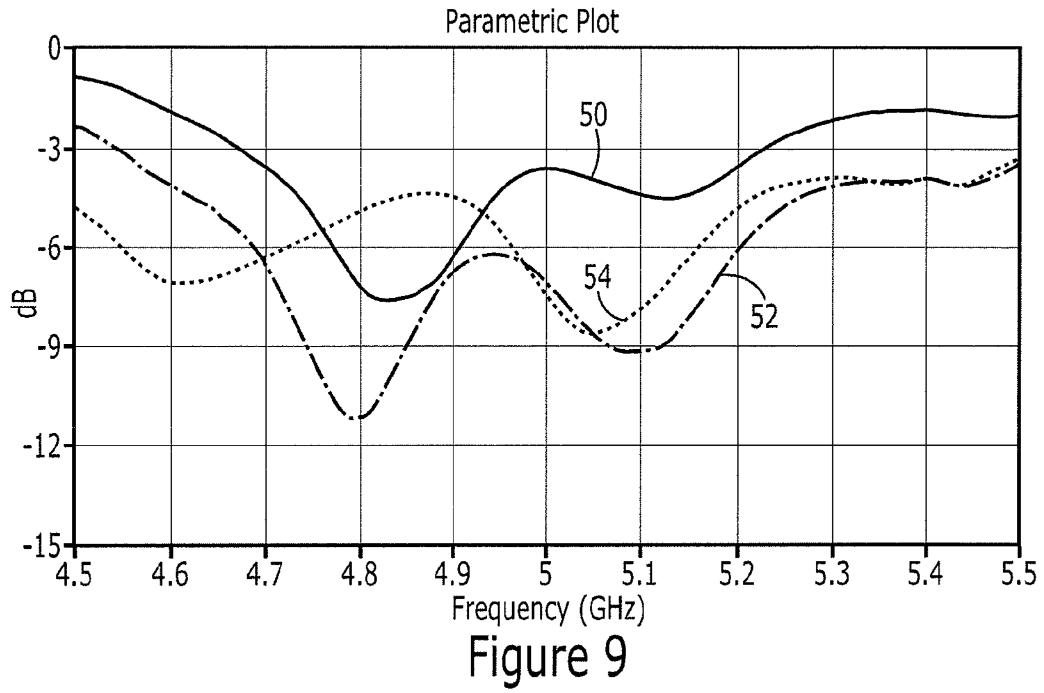
Figure 10:
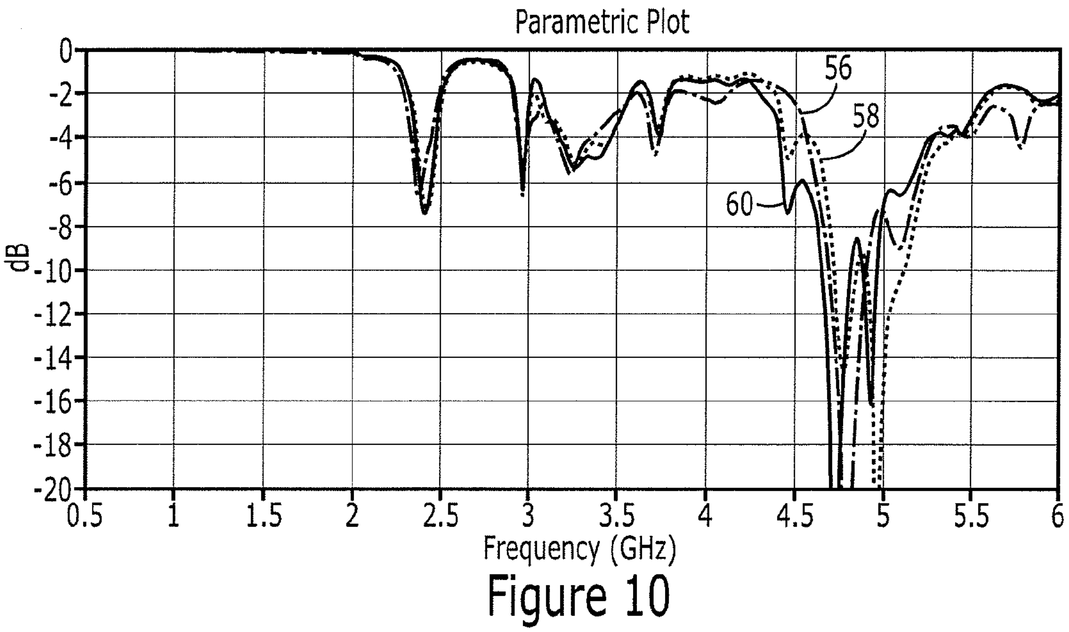

Having thus described aspects of the present disclosure in general terms, reference will now be made to the accompanying drawings, which are not necessarily drawn to scale, and wherein:

FIG. 1 is a perspective view of a portable electronic device that may be constructed in accordance with an example embodiment of the present invention;

FIG. 2 is a side view of a printed wiring board that includes a second conductive portion that may define an open-ended non-conductive slot to be fed signals from the radio frequency circuitry;

FIG. 3 is a perspective end view of an apparatus embodied by a portable electronic device in accordance with an example embodiment of the present invention;

FIG. 4 is a fragmentary plan view of the second conductive portion including the open-ended non-conductive slot and the conductive element that extends between and conductively couples the second conductive portion and a conductive housing in accordance with an example embodiment of the present invention;

FIG. 5 is a fragmentary perspective view of the second conductive portion defining the open-ended non-conductive slot and the conductive element extending between and conductively coupling the second conductive portion and the conductive housing with the display having been removed for purposes of illustration in accordance with an example embodiment of the present invention;

FIG. 6 is an end view of the apparatus embodied by a portable electronic device of FIG. 3 which also depicts the potential conductive loops that may be defined based upon the frequency to be excited in accordance with an example embodiment of the present invention;

FIG. 7 is a graphical representation of an S parameter of an antenna in accordance with an example embodiment of the present invention;

FIG. 8 is a graphical representation of variations in the resonance of the antenna attributable to changes in the location of the second conductive element relative to the slot in accordance with an example embodiment of the present invention;

FIG. 9 is a graphical representation of variations in the resonance of the antenna attributable to changes in the length of the slot in accordance with an example embodiment of the present invention; and FIG. 10 is a graphical representation of changes in the resonance of the antenna attributable to changes in the location at which the slot is fed with signals from the radio frequency circuitry in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

An apparatus is provided in accordance with an example embodiment to facilitate the tuning of the resonance of an antenna including an antenna that is disposed at least partially within a conductive housing. As such, the apparatus may be embodied by a portable electronic device, but may still permit the resonance of an antenna disposed within the conductive housing of the portable electronic device to be tuned. Thus, the apparatus of an example embodiment permits the antenna performance to be enhanced as a result of the tuning of the resonance of the antenna, while concurrently permitting the apparatus and an associated portable electronic device to enjoy the aesthetic quality provided by a conductive housing.

Referring now to FIG. 1, a portable electronic device 10 in accordance with an example embodiment of the present invention is depicted. The portable electronic device may be a mobile telephone, a smartphone, a PDA or the like. Alternatively, the portable electronic device may be a tablet computer, a laptop or other portable computing device, such as a game player, a game controller, an audio and/or video recorder, and audio and/or video player, a satellite communication device, for example for one or more of the global positioning system (GPS), the Global Navigation Satellite System (GLONASS), the Galileo system or the like. The portable electronic device may embody an apparatus that includes a conductive housing 12. The conductive housing includes a first conductive portion 13 and may be formed of a metal or other conductive material so as to provide enhanced aesthetic qualities for a user handling the portable electronic device.

Although the conductive housing 12 may be constructed in various manners, the conductive housing of an example embodiment may be formed of a conductive tube that may form the first conductive portion 13 and that defines an internal volume in which a number of components, such as processing circuitry, memory or the like, of the portable electronic device 10 are housed. By way of example, the conductive housing may be formed as a cuboid having six side surfaces including a first pair of opposed side surfaces and a second pair of opposed side surfaces, as well as a pair of opposed end surfaces. In this example embodiment, the first pair of opposed side surfaces may be wider than the second pair of opposed side surfaces. In regards to the embodiment of FIG. 1, for example, the first pair of opposed side surfaces may include the top and bottom side surfaces, while the second pair of opposed side surfaces may include the left and right side surfaces.

The portable electronic device 10 of an example embodiment may also include a display 14. In the illustrated embodiment in which the conductive housing 12 including at least the first pair of opposed side surfaces forms the first conductive portion 13, the first conductive portion of the conductive housing 12 may define an opening within which to receive the display 14. The first conductive portion of the conductive housing of this example embodiment may also define one or more buttons 16 or the like for receiving user input.

The first conductive portion 13 of the conductive housing 12 also defines a non-conductive aperture 19, such as shown in FIG. 3. In an example embodiment in which the conductive housing comprises a conductive tube, at least one end of the conductive tube may be open so as to define the non-conductive aperture. Alternatively, each of the opposed ends of the conductive tube that forms the conductive housing of this example embodiment may be open so as to define non-conductive apertures. In the embodiment illustrated in FIG. 1, the end of the conductive housing facing the viewer may define the non-conductive aperture. Although the open end of the conductive housing defines a non-conductive aperture so as to be electrically open, the end of the conductive housing may be physically closed, such as with a non-conductive material, such as plastic, e.g., acrylonitrile butadiene styrene (ABS), polycarbonate ABS (PC-ABS), etc. Additionally, one or more functions of the portable electronic device 10 may be provided via the non-conductive aperture, such as the open end of the conductive housing. As shown in FIG. 1, for example, one or more inputs 18 (or outputs or both inputs and outputs) may be provided via the open end of the conductive housing. In addition to a switch or button to facilitate user input, other functions may be provided via the non-conductive aperture including a connector function, an imaging function or the like.

Within the internal volume defined by the conductive housing 12, various components of a portable electronic device 10 may be housed. For example, the apparatus embodied by the portable electronic device may include a printed wiring board 20. The printed wiring board may include a ground plane 22 formed of a metallic or other conductive material. The ground plane 22 may provide an electrical reference plane for the one or more antennas of the portable electronic device 10. The printed wiring board may be configured to carry a plurality of components and to electrically interconnect those components with one another and with other components or elements external to the printed wiring board. For example, the printed wiring board may carry the radio frequency (RF) circuitry 24 that is configured to transmit and/or receive RF signals.

As shown in FIG. 3, an apparatus in accordance with an example embodiment is depicted. In this regard, the apparatus includes a second conductive portion 25 disposed at least partially within the conductive housing 12. The second conductive portion defines an open-ended non-conductive slot 26. As shown in FIG. 3, the slot is positioned proximate, such as adjacent, the non-conductive aperture 19 defined by the conductive housing 12. For example, the second conductive portion includes an arm that extends in an L-shape relative to the remainder of the second conductive portion so as to define a slot therebetween, as shown in FIGS. 3 and 4. In the illustrated embodiment, the ground plane 22 serves as the second conductive portion that defines the open-ended non-conductive slot. However, the second conductive portion may be formed of another conductive element in other embodiments.

The slot 26 is configured to couple to the radio frequency circuitry 24. For example, the radio frequency circuitry may be fed to the slot by the printed wiring board 20. In the illustrated embodiment, the second conductive portion 25 includes a feed point 28 at which the radio frequency signals are fed to the slot. As shown in FIG. 4, for example, the feed point may be defined by first and second conductive portions that extend laterally into the slot from opposed sides of the slot so as to define a narrower slot or gap therebetween across which the radio frequency signals are fed.

Although described herein to define a non-conductive slot 26, the second conductive portion 25 may have any of various two-dimensional or three-dimensional shapes. Moreover, the second conductive portion may be a monolithic structure or may be comprised of two or more individual conductive elements to form an overall constructive structure within the conductive housing 12. For example, the second conductive portion may be formed as a combination of three distinct components, namely, a first conductive element comprised of a single layer of copper of a printed wiring board, such as a small sized printed wiring board having an area much smaller than the total area of the conductive housing, a second conductive element comprised of a metal frame or other structural component of the device, and an additional printed wiring board, such as another small sized printed wiring board having an area much smaller than the total area of the conductive housing. The three distinct components that are combined to for the second conductive portion of this example embodiment may be electrically interconnected, such as by the ground plane. Since the second conductive structure is directly or galvanically coupled to the first conductive structure, the resulting combination of this embodiment may not only form the overall ground plane of the device 10, but also provides a radiating element, e.g., the ground plane or at least the conductive housing that is configured to radiate.

The apparatus of an example embodiment also includes a conductive element 30 extending between and conductively coupling the first and second conductive portions 13, 25. For example, the conductive element may be formed of a metal or other conductive material. As shown in FIG. 3, the conductive element 30 may extend from a first end that is conductively coupled to the first conductive portion to a second end that is conductively coupled to the second conductive portion. In the illustrated embodiment, for example, the conductive element 30 extends between the ground plane 22 of the printed wiring board 20 that defines the second conductive portion to the first conductive portion of the conductive housing 12, such as the side surface of the conductive housing that carries the display 14.

Although the conductive element 30 may be conductively coupled to various portions of the second conductive portion 25, the conductive element may be conductively coupled to a portion of the second conductive portion that is proximate to the slot 26, such as by being disposed laterally relative to the longitudinally-extending slot. With respect to the illustrated embodiment, the conductive element 30 is conductively coupled to an arm of the second conductive portion that defines the open-ended non-conductive slot 26 so as to be positioned alongside the slot.

As shown in FIG. 5, the conductive element 30 may be conductively coupled to the conductive housing 12 in various manners. In the illustrated embodiment of FIG. 5, the conductive element is conductively coupled to one of the wider side surfaces, hereinafter referenced as the first side surface, such as the top surface of the portable electronic device 10 in the orientation of FIG. 1. In an example embodiment, the first side surface of the conductive housing to which the conductive element is conductively coupled may be configured to carry the display 14. The first side surface may therefore include a bar 32 positioned between the display and the non-conductive aperture. As shown in FIG. 5, the conductive element 30 may be conductively coupled to the bar 32 of the first side surface. As such, the conductive element extends between the conductive housing, such as the bar of the first side surface, and the second conductive portion 25, such as the portion of the second conductive portion proximate the slot 26 defined thereby. However, the conductive element does not extend to the second side surface of the conductive housing, opposite the first side surface. In other words, there is a gap between the second end of the conductive element 30 that is conductively coupled to the second conductive portion and the second side surface of the conductive housing. Consequently, the conductive element does not conductively couple the opposed side surfaces of the conductive housing.

The conductive element 30 may be configured to form an exterior portion of the portable electronic device 10. As such, at least part of the conductive element 30 of this example embodiment may be exposed externally. Alternatively, the conductive element may include a coating of a non-conductive material, such as plastic, e.g., ABS, PC-ABS, etc.

By conductively coupling the first and second conductive portions 13, 25 with the conductive element 30, the energy that is fed across the slot 26 extends to the conductive housing 12, such as the bar 32 of the first side surface of the conductive housing, so as to radiate to free space. As a result of feeding radio frequency energy between the slot and the non-conductive aperture, such as the open end of the conductive housing, the radiation efficiency of the antenna is increased even though the antenna is at least partially disposed within the conductive housing.

As also shown in FIG. 3, the apparatus of an example embodiment may also optionally include a further conductive element 34, such as a shorting element, positioned within and extending across the non-conductive aperture. In this regard, the further conductive element may extend between and conductively couple a pair of opposed side surfaces of the conductive housing 12, such as the first and second side surfaces that form the top and bottom of the portable electronic device illustrated in FIG. 1.

The further conductive element 34 may be sized so as to decrease the area of the non-conductive aperture 19, such as the open end of the conductive housing 12. Since the frequency band at which the antenna defined by the slot 26 operates most efficiently is defined in part by the area of the non-conductive aperture, the control over the area of the non-conductive aperture provided by the further conductive element permits the frequency band of the antenna to be controlled or defined.

As shown in FIG. 6, the further conductive element 34 in combination with the conductive housing 12 may define first and second current loops 36, 38 that may be excited by the radio frequency energy fed to the slot 26. As shown, the first and second current loops are defined by the further conductive element and different portions of the conductive housing. The frequency at which the current loops are configured to resonate may depend upon the size of the loops. For example, higher frequencies may be excited by changing the position of the further conductive element relative to the conductive housing such that the second current loop is larger, e.g., wider, than the first current loop. Although the first current loop is shown to be larger than the second current loop in FIG. 6, the further conductive element may be differently positioned relative to the conductive housing such that the first and second current loops have the same size or the second current loop is larger than the first current loop in other embodiments. As also shown in FIG. 6, a third current loop 40 is also defined by the area of the end of the conductive housing. In instances in which the third current loop is sized to resonate at the desired frequency, the further conductive element may optionally be eliminated.

In some example embodiments, the apparatus may include a plurality of further conductive elements 34 which divide the overall aperture 19 defined end of the conductive housing 12 into additional current loops, at least some of which define a smaller area than if only two conductive loops were defined by a single further conductive element. Additionally or alternatively, the non-conductive aperture defined by the end face of the conductive housing may be opened up, that is, continue, around the corner of the conductive housing so as to include a contiguous opening defined by any of the other side surfaces in other example embodiments, thereby permitting larger current loops to be defined and/or providing increased radiated efficiency. The non-conductive aperture could be any shape and not just rectangular or oval as shown in the figures. For example, the non-conductive aperture could have a polygonal or any other irrational shape or combinations of common shapes, e.g., circles, rectangles, ovals, etc.

The antenna of an example embodiment may have a relatively wide bandwidth, such as by providing an antenna with no more than a −6 dB return loss from about 4.7 GHz to 5.2 GHz, that is, across a bandwidth of 500 MHz, for an associated −4.6 to −5.6 dB radiated efficiency (or a −5.8 to −6.7 dB total efficiency). For example, a graphical representation of the S parameter, that is, S11 representative of the reflection coefficient or return loss of the antenna, is provided that depicts the bandwidth about 5 GHz. The antenna of an example embodiment may also provide a dual band structure. For example, the antenna of an embodiment may have a resonance at 2.4 GHz in the Bluetooth/Wireless Local Area Network (WLAN) bands, and a resonance at 5 GHz. Although the bandwidth at one of the resonances, e.g., at 2.4 GHz, may be less than the bandwidth at the other resonance, e.g., at 5 GHz, as shown in FIG. 7, the antenna of this example embodiment may have a radiated efficiency of about −3.3 to −4.2 dB.

Further, the apparatus of an example embodiment permits the resonance of the antenna defined by the slot 26 to be tuned even though the antenna is at least partially disposed within the conductive housing 12. In this regard, the resonance may be tuned in one or more different manners. For example, the location of the conductive element 28 relative to the slot may be varied in order to tune the resonance of the antenna. As shown in FIG. 8, for example, curve 42 depicts the S parameter for a conductive element at a first location relative to the slot. For purposes of comparison, the curve 44 generated in response to movement of the conductive element 2 millimeters to the left, such as toward the closed end of the slot, is depicted along with the curve 46 that is generated in response to movement of the conductive element 2 millimeters towards the open end of the slot.

Referring now to FIG. 9, the resonance of the antenna may also be tuned by changing the length of the slot 26, such as measured as shown at 48 of FIG. 4. In this regard, the S parameter for the first resonance of the antenna having a shorter slot length as represented by a curve 50 is greater at 5 GHz than the S parameter for the first resonance at 5 GHz for an intermediate sized slot and a longer slot as represented by curves 52 and 54, respectively. Further, the resonance of the antenna may be tuned by changing the location at which the slot is fed radio frequency signals. In this regard, FIG. 10 depicts curves 56, 58 and 60 for S parameters generated in response to the slot being fed at a predefined location, at a location shifted 0.8 millimeters towards the closed end of the slot and shifted 2.0 millimeters towards the closed end of the slot, respectively. As shown, when the slot is fed at a location closer to the open end of the slot, the second resonance at 5 GHz is shifted higher.

As such, the resonance of the antenna defined by the slot 26 may be tuned by changing one or more of the length of the slot, the location which the slot is fed with signals from the radio frequency circuitry 24 or the location of the conductive element 30 relative to the slot. Thus, the performance of the antenna may be controlled and, in some instances, improved even though the antenna is at least partially disposed within a conductive housing 12, such as the conductive housing of a portable electronic device 10. Moreover, the conductive housing of the portable electronic device need not be redesigned in an effort to maintain the performance of the antenna housed therein and, instead, the antenna design may be modified, such as by tuning the resonance as described above, to compensate for a design change in the conductive housing.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising:

a conductive housing comprising a first conductive portion, the first conductive portion defining a non-conductive aperture;

a second conductive portion disposed at least partially within the conductive housing, the second conductive portion defining an open-ended non-conductive slot spaced apart from the conductive housing, at least a portion of the slot being defined between opposed sides formed by the second conductive portion, the second conductive portion also defining a closed end of the slot that is opposite an open end of the slot, the slot being configured to couple to radio frequency circuitry configured to at least one of transmit or receive radio frequency signals via the slot, the slot defining a feed point having a narrower gap than other portions of the slot and across which radio frequency signals from the radio frequency circuitry are fed to the slot; and a conductive element extending between and conductively coupling the first and second conductive portions at a location spaced apart from the closed end of the slot.

2. An apparatus according to claim 1 further comprising a further conductive element positioned within and extending across the non-conductive aperture.

3. An apparatus according to claim 1 further comprising a printed wiring board that includes the second conductive portion.

4. An apparatus according to claim 1 wherein resonance is configured to be tuned by one or more of a length of the slot, a location at which the slot is fed with signals from the radio frequency circuitry or a location of the conductive element relative to the slot.

5. An apparatus according to claim 1 wherein the conductive element is configured to form an exterior portion of a device that incorporates the apparatus.

6. An apparatus according to claim 1 wherein the conductive element comprises a coating of a non-conductive material.

7. An apparatus according to claim 1 wherein the conductive housing comprises a first pair of opposed side surfaces and a second pair of opposed side surfaces, the first pair of opposed side surfaces being wider than the second pair of opposed side surfaces, and wherein the conductive element is conductively coupled to a side surface of the first pair.

8. An apparatus according to claim 7 wherein the first pair of opposed side surfaces comprises first and second side surfaces, the first side surface configured to carry a display such that the first side surface comprises a bar positioned between the display and the non-conductive aperture, and wherein the conductive element is conductively coupled to the bar of the first side surface.

9. An apparatus comprising:

a conductive housing comprising a first conductive portion, the first conductive portion defining a non-conductive aperture;

a printed wiring board comprising a second conductive portion disposed at least partially within the conductive housing, the second conductive portion defining an open-ended non-conductive slot spaced apart from the conductive housing, at least a portion of the slot being defined between opposed sides formed by the second conductive portion, the second conductive portion also defining a closed end of the slot that is opposite an open end of the slot, the slot being configured to couple to radio frequency circuitry configured to at least one of transmit or receive radio frequency signals via the slot, the slot defining a feed point having a narrower gap than other portions of the slot and across which radio frequency signals from the radio frequency circuitry are fed to the slot; and a conductive element extending between and conductively coupling the first and second conductive portions at a location spaced apart from the closed end of the slot, wherein resonance is configured to be tuned by one or more of a length of the slot, a location at which the slot is fed with signals from the radio frequency circuitry or a location of the conductive element relative to the slot.

10. An apparatus according to claim 9 further comprising a further conductive element positioned within and extending across the non-conductive aperture.

11. An apparatus according to claim 9 wherein the conductive housing comprises a first pair of opposed side surfaces and a second pair of opposed side surfaces, the first pair of opposed side surfaces being wider than the second pair of opposed side surfaces, and wherein the conductive element is conductively coupled to a side surface of the first pair.

12. An apparatus according to claim 11 wherein the first pair of opposed side surfaces comprises first and second side surfaces, the first side surface configured to carry a display such that the first side surface comprises a bar positioned between the display and the non-conductive aperture, and wherein the conductive element is conductively coupled to the bar of the first side surface.

13. A portable electronic device comprising:

a display;

a conductive housing configured to carry the display, the conductive housing comprising a first conductive portion that defines a non-conductive aperture;

radio frequency circuitry disposed at least partially within the conductive housing, the radio frequency circuitry configured to at least one of transmit or receive radio frequency signals;

a second conductive portion disposed at least partially within the conductive housing, the second conductive portion defining an open-ended non-conductive slot spaced apart from the conductive housing, at least a portion of the slot being defined between opposed sides formed by the second conductive portion, the second conductive portion also defining a closed end of the slot that is opposite an open end of the slot, the slot being configured to couple to the radio frequency circuitry, the slot defining a feed point having a narrower gap than other portions of the slot and across which radio frequency signals from the radio frequency circuitry are fed to the slot; and a conductive element extending between and conductively coupling the first and second conductive portions at a location spaced apart from the closed end of the slot.

14. A portable electronic device according to claim 13 further comprising a further conductive element positioned within and extending across the non-conductive aperture.

15. A portable electronic device according to claim 13 further comprising a printed wiring board that includes the second conductive portion.

16. A portable electronic device according to claim 13 wherein resonance is configured to be tuned by one or more of a length of the slot, a location at which the slot is fed with radio frequency signals from the radio frequency circuitry or a location of the conductive element relative to the slot.

17. A portable electronic device according to claim 13 wherein the conductive element is configured to form an exterior portion of the portable electronic device.

18. A portable electronic device according to claim 13 wherein the conductive element comprises a coating of a non-conductive material.

19. A portable electronic device according to claim 13 wherein the conductive housing comprises a first pair of opposed side surfaces and a second pair of opposed side surfaces, the first pair of opposed side surfaces being wider than the second pair of opposed side surfaces, and wherein the conductive element is conductively coupled to a side surface of the first pair.

20. A portable electronic device according to claim 19 wherein the first pair of opposed side surfaces comprises first and second side surfaces, the first side surface configured to carry the display such that the first side surface comprises a bar positioned between the display and the non-conductive aperture, and wherein the conductive element is conductively coupled to the bar of the first side surface.

* * * * *